July 2, 1963 W. LIMBERGER Re. 25,408

CONTINUOUS EXPOSURE APPARATUS FOR PRODUCING PHOTOCOPIES FROM FLAT PATTERNS

Original Filed May 21, 1956 2 Sheets-Sheet 1

Inventor:
WALTER LIMBERGER
BY: Beaman and Patty
ATTORNEYS

July 2, 1963 W. LIMBERGER Re. 25,408

CONTINUOUS EXPOSURE APPARATUS FOR PRODUCING PHOTOCOPIES FROM FLAT PATTERNS

Original Filed May 21, 1956 2 Sheets-Sheet 2

Inventor:

WALTER LIMBERGER

By: Bernard Patin

Attorneys

United States Patent Office

Re. 25,408
Reissued July 2, 1963

25,408

CONTINUOUS EXPOSURE APPARATUS FOR PRODUCING PHOTOCOPIES FROM FLAT PATTERNS

Walter Limberger, Hamburg, Germany, assignor to Lumoprint Zindler K.G., Hamburg, Germany Original No. 2,930,284, dated Mar. 29, 1960, Ser. No. 586,162, May 21, 1956. Application for reissue June 7, 1961, Ser. No. 121,805
Claims priority, application Germany May 20, 1955
7 Claims. (Cl. 88—24)

Matter enclosed in heavy brackets [ ] appears in the original patent but forms no part of this reissue specification; matter printed in italics indicates the additions made by reissue.

The invention relates to a device for producing photocopies from substantially flat original documents, in which the exposure is performed through a narrow slot arranged perpendicularly to the direction in which the document is moved.

In order to produce photocopies, contact exposure has frequently been used, necessarily affording a 1:1 scaled image. On the other hand, to reproduce the original document or master on an enlarged or decreased scale, the latter being often desirable in consideration of the high price of paper, apparatus including optical devices achieving this effect by means of lenses are also known. In such apparatus not only the contact process but also the continuous-exposure system is used. In the latter, the film strip to be exposed is moved with a speed which is controlled in accordance with the reduction or magnifying factor required. In apparatus of this kind as hitherto proposed, however, the plane of the original and the projection station must be at a large distance apart from one another or be graduated in depth, which results in a large and expensive apparatus which is inconvenient for practical reasons.

One object of the invention is therefore to provide a simple and inexpensive continuous-exposure apparatus requiring a minimum of space, including an optical system, i.e. a lens arrangement, allowing the reproduction of originals with little expenditure and on a modified, in particular on a reduced scale.

A further object of the invention is to provide a combined optical and contact exposure apparatus, which, renouncing the possibility of reproducing thick stiffly bound books or volumes, or any other thick, stitched originals, is effective to deal with a high percentage (about 90%) of all plane originals, such as letters, drawings, journals up to 1 cm. thickness, by means of a unitary device in an extremely simple manner, i.e. with the least possible expenditure in space, work, time, power and costs.

The present invention has furthermore the object of providing an apparatus of simple arrangement with only a small number of mirrors.

In accordance with the invention a continuous-exposure apparatus for producing photocopies from substantially flat originals comprises means providing an exposure slot arranged perpendicularly to the path of movement of the original to be copied, means providing an image slot arranged perpendicularly to the path of movement of the film to be exposed, the slots being approximately linear in form and parallel to each other, a system of mirrors inclined to the slots for reflecting light from the original and directing the light on to the film, means for feeding the original and the film past the slots at proportional speeds, a common feed slot for the original and the film having diverging guideways, pressure feed means associated with each of the slots, the guideways being arranged to feed the original and the film separately between the appropriate slot and the pressure feed means associated therewith, an enclosing case through which the common feed slot opens and in which the means providing the slots and associated components are housed, and an ejection slot extending from the exposure and image slots through the casing.

The invention will be more clearly understood from the following detailed description of three preferred embodiments thereof which are shown, by way of example, in simplified representation in the accompanying drawing, in which.

Figure 1:
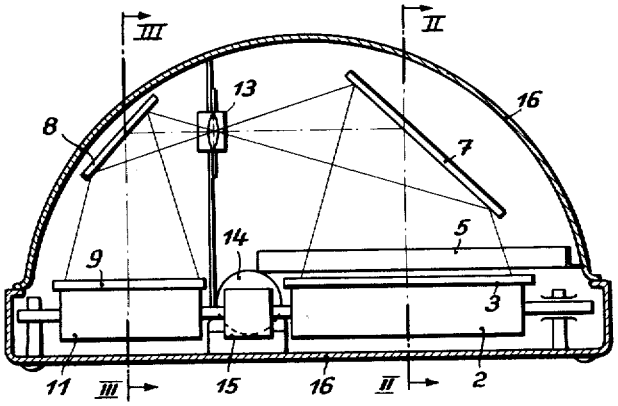
FIG. 1 represents a section through a continuous-exposure apparatus designed in accordance with the invention.
Figure 2:
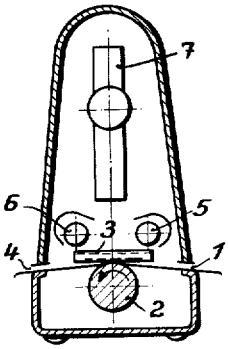
FIG. 2 shows a cross section along line II—II of FIG. 1.
Figure 3:
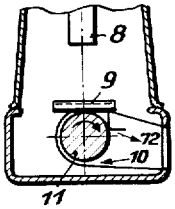
FIG. 3 shows a partial section along line III—III of FIG. 1.

The object or pattern will be inserted in the case of the apparatus represented by FIGS. 1–3, with the side to be copied turned towards the top, into the feed slot 1 and gripped by the *rotatable and compressible* roller 2 [being rotatable and compressible] as indicated by the arrow, pressed against a plane glass strip 3 and ejected again through the delivery slot 4. While running through, the object or pattern will be irradiated by the luminescent lamps 5 and 6 and the reflected light will be projected over the mirrors 7 and 8 through the plane glass strip 9 to the emulsion carrier which is introduced by the insertion slot 10, gripped by the roller 11, pressed to the glass strip 9 and ejected through the delivery slot 12. The image is [performed] *formed* by the lens or objective 13. The motor 14 drives both rollers through the gear 15 in such a manner that they [do] move in opposed directions. The speed of the roller 11 is reduced by [the reduction] *a desired* factor in comparison with the speed of roller 2. The whole apparatus is encased by the body 16.

In producing a contact copy the object or pattern and the emulsion carrier are merely inserted into the slot 1, [whereby] the luminous intensity of the luminescent lamps 5 and 6 [will be either] *being* correspondingly throttled *either* by electric means or by diaphragms. This apparatus will e.g. enable [to produce] *the production of* contact copies on a scale of 1:1, whereas a reduction will be attained by optical means.

Figure 5:
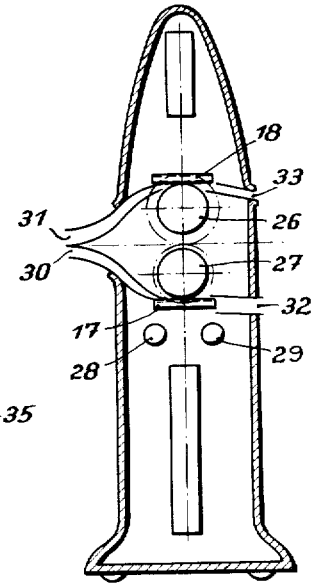
FIG. 5 shows a section along line V—V of FIG. 4.
Figure 4:
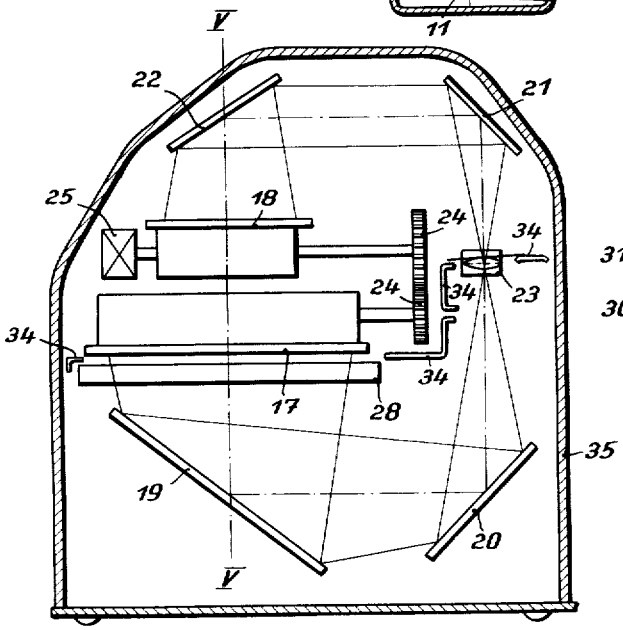
FIG. 4 shows a section through another embodiment of the invention.

The apparatus according to FIGS. 4–5 is based on the same principle of the invention. Merely the object or pattern surface 17 and the image surface 18 are arranged one above [another] *the other*. As [to] *will* be seen, four mirrors 19, 20, 21 and 22 as well as the objective 23 will be required.

The gear 24 and the motor 25 [do] impart [both these] *to two* rollers 26 and 27 the corresponding directions of rotation. The rod-like exposure lamps 28 and 29 [do] provide the necessary illumination of the object or pattern.

When producing a copy by the optical method (thereby reducing the scale) the object or pattern will be inserted into the slot 30 with the side to be copied facing downwardly, whereas the emulsion carrier will be simultaneously brought in by the slot 31. The goods to be copied, [or] *and* the exposed emulsion carrier will be ejected through the slots 32 and 33. The partition wall 34 [is separating] *divides* the object[-]compartment and the exposure compartment into two light-tight parts [being] separated one from another. The casing 35 [is enclosing] *encloses* the device.

The design according to FIGS. 1–3 will generally be preferred, as it is simpler and less expensive as regards its manufacture. In contrast thereto, the embodiment according to FIGS. 4–5 [shows] *has* the advantage [that it will be very likely somewhat easier to place] *of simplifying the position of* both papers simultaneously by their ends [to] *at* the objects or image plane.

Figure 6:
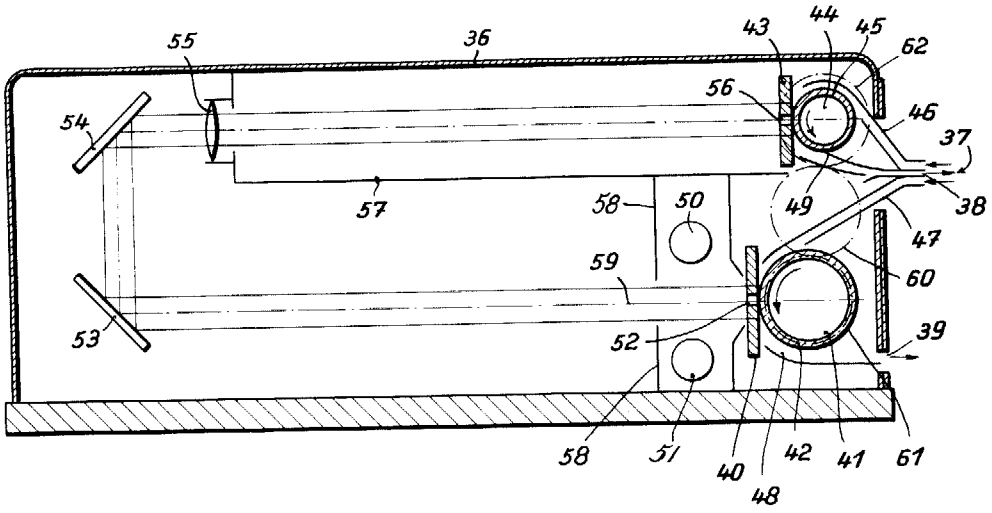
FIG. 6 shows a diagrammatic side view of yet another form of the invention.

The continuous-exposure apparatus represented by FIG. 6 is enclosed by a housing [being] provided at one of its lateral walls with a common feed slot 37 for the photocopy paper and the object or pattern to be exposed, with a discharge slot 38 for the exposed photocopy paper and a discharge slot 39 for the exposed object or pattern.

In the lower part of the apparatus there is a glass plate 40, serving as exposure surface and [being impacted] *engaged* on its reverse side by a pressure roller 41. The pressure roller, the axis of which [is extending] *extends* in horizontal direction, is provided with an elastic shell 42 [being] made of rubber or rubber-like synthetic material. Parallel to said exposure surface 40 a further glass[-]plate 43 is provided in the upper half of the apparatus, which may be employed as image surface. The glass-plate 43 is also provided with a pressure roller 44 on its backside, the axis of which [is extending] *extends* in parallel direction to the axis of the pressure roller 41. This roller, too, is provided with a rubber-like shell 45. The insertion slot 37 arranged between both rollers 41 and 44 [shows] *has* in its center the ejection slot 38 subdividing the insertion slot into two diverging guide ways 46 and 47. [If inserting] *Upon insertion of* the object or pattern into the slot 37 [and] *together with* the light-sensitive photocopy paper in such a manner that the surface of the object or pattern to be reproduced and the light-sensitive emulsion of the photocopy paper will be laid one upon [another] *the other,* both these papers will be separated by the discharge slot, so that the photocopy paper may be shoved over the path 46 into the slot arranged between plate 43 and roller 44 and the object or pattern can be inserted over the path 47 into the slot arranged between roller 41 and glass plate 40. When the exposure is finished the object or pattern leaves the apparatus over the curvilinear guide way 48 across the discharge slot 39 and the exposed photocopy paper will do so over the curvilinear guide way 49 and the discharge slot 38.

As the rollers and glass plates, substantially extending over the total width of the apparatus, [do] have merely [a single touch of] line *contact with each other,* a slot-like exposure and reproduction will [be substantially performed in the event of running through] *occur during passage* of the object or pattern and the [reproduction] *copy*. Instead of the glass plates 40 and 43 also other, if necessary, opaque plates may be employed, which must [show] *possess* within the [sphere] *region* of roller contact a corresponding slot. If necessary, also the glass plates 40 and 43 may be made non-transparent and screened off apart from a single slot.

Two linear sources of light 50 and 51 arranged at both sides of the exposure slot 52 [are serving] *serve* for exposing the object or pattern, *i.e. the master sheet carrying the original which is to be photographically reproduced on the photosensitive copying sheet.* The exposure slot 52 illuminated by the sources of light is [depicted] *projected* with the aid of the two obliquely adjusted mirrors 53 and 54 through the lens arrangement 55 on the image slot 56 of the glass plate 43. Both these mirrors 53 and 54 are designed strip-like, are preferably arranged in the same vertical plane and [do both] include an angle of 90°.

As *is* to be seen from FIG. 6, the path which must be [travelled] *traveled* by the light from the slot of exposure 52 over the mirrors 53 and 54 to the lens 55 is larger than the distance between the image slot 56 and the lens 55. [Hereby] *Thereby* a reduction of the object or pattern will be performed. As the pressure rollers 41 and 44 which are carrying the object [or] *and* the photocopy paper, *respectively,* must be propelled with different surface speeds, the diameters of the rollers 41 and 44 are so differently designed in accordance with the scale of the illustration in this preferred embodiment that their ratio will be that of the image scales. In this manner both rollers may be driven in *the* same sense of rotation with the same r.p.m. (number of revolutions *per minute*). For example, the gear wheel 60 [will serve for doing so,] *may be used for this purpose;* [which is meshing] *this gear meshes* with two equal toothed wheels 61 and 62 on the axles of the rollers 41 and 44.

On the other hand, the invention is not limited to reducing photocopy apparatus, and the invention may also be applied [for] *to* images of 1:1 as well as enlargements, [whereby] *in which case* the pressure cylinders having the same or different diameters must be driven with corresponding circumferential speeds.

The image aggregate consisting of image surface 43, pressure roller 44 and lens 55 is encased by an interior partition wall 57 *in an* absolutely light-tight *manner,* so that the image-forming rays may [merely] enter [over] *through* the lens 55. In order to prevent that light will be directly conducted from the sources of light 50 and 51 [over] *via* the mirror arrangement, diaphragms 58 have been provided on the side of the sources of light 50 and 51 [being] averted from the object or pattern surface 40, which merely [show a mean pervading slot] *form a passage* 59 [,] across which the light reflected from the object or pattern slot may be conducted to the mirror 53.

The apparatus designed in accordance with the invention is distinguished by its simple construction, its short length and beyond that the apparatus may be easily operated, [as] without risking an untimely exposure *as* the light-sensitive emulsion of the photocopy paper [with the pattern] is covered *by the pattern* and may be introduced simultaneously with same into the slot 37 of the apparatus. The arrangement of the ejection slots 38 and 39 on the same casing wall at which the feed slot 32 has been provided [,] enables an excellent control of the apparatus.

The invention is not merely limited to the special embodiments and will allow [that] numerous modifications [can be performed] as regards details, furthermore it will be possible that the apparatus in accordance with the invention [can] be applied, [beside] *besides from* producing optical photocopies, also for manufacturing same by the contact process.

What I claim is:

1. A continuous-exposure apparatus for producing photocopies from substantially flat originals, comprising means providing an exposure slot arranged perpendicularly to the path of movement of [the] *an* original to be copied, means providing an image slot arranged perpendicularly to the path of movement of [the] *a* film to be exposed, the slots being approximately linear in form and parallel to each other, a system of mirrors inclined to the slots for reflecting light from the original and directing the light [on to] *onto* the film, an optical system included in the path of light reflected from said original to the film, means for feeding the original and the film past the slots at proportional speeds, *means providing* a common feed slot for the original and the film having diverging guideways, pressure feed means associated with each of the slots, the guideways being arranged to feed the original and the film separately between the appropriate slot and the pressure feed means associated therewith, an enclosing casing through which the common feed slot opens and in which the means providing the slots and associated components are housed, and *means providing* ejection slots extending from the exposure and image slots through the casing.

2. An apparatus as defined in claim 1 wherein said exposure and image slots are arranged one above the other.

3. An apparatus as claimed in claim 1 wherein the pressure feed means comprise pressure rollers associated with surfaces [affording] *forming* the exposure and image slots.

4. An apparatus as defined in claim 3 wherein the rollers are located between [the defined] *said* surfaces.

5. An apparatus as defined in claim 4 wherein the surfaces are in the form of plane glass strips rendered opaque except for [position] *locations* forming the slots.

6. An apparatus as defined in claim 5 wherein the discharge sides of the pressure rollers are provided with guideways for ejecting the original and the exposed film, the *last-mentioned* guideways leading to the ejection slots which extend parallel to the insertion slot and are provided in the same casing wall as the insertion slot.

7. An apparatus as defined in claim 6 wherein the common feed slot extends substantially perpendicularly to the common plane of the exposure surface and the image surface.

References Cited in the file of this patent or the original patent

UNITED STATES PATENTS

| | | |
|---|---|---|
| 1,344,896 | Jobke | June 29, 1920 |
| 1,539,322 | Morton | May 26, 1925 |
| 2,058,415 | Chretien | Oct. 27, 1936 |
| 2,227,110 | Stuart | Dec. 31, 1940 |
| 2,234,717 | Altman et al. | Mar. 11, 1941 |
| 2,288,352 | Henderson | June 30, 1942 |
| 2,391,044 | Terry | Dec. 18, 1945 |
| 2,420,141 | Lessler | May 6, 1947 |
| 2,427,443 | Cochran | Sept. 16, 1947 |
| 2,472,931 | Yohn | June 14, 1949 |
| 2,478,980 | Pratt | Aug. 16, 1949 |
| 2,578,320 | Schubert | Dec. 11, 1951 |
| 2,615,365 | Johnson | Oct. 28, 1952 |

FOREIGN PATENTS

| | | |
|---|---|---|
| 716,567 | Great Britain | Oct. 6, 1954 |